Sept. 10, 1957  C. W. ADAMS  2,805,478
TOOTH SHADE GUIDE
Filed Jan. 20, 1955

INVENTOR
CLAUDE W. ADAMS

BY

ATTORNEY

United States Patent Office 2,805,478
Patented Sept. 10, 1957

2,805,478

TOOTH SHADE GUIDE

Claude W. Adams, York, Pa., assignor to The Dentists' Supply Company of New York, York, Pa., a corporation of New York Application January 20, 1955, Serial No. 483,013

5 Claims. (Cl. 32—71)

This invention relates to improvements in artificial tooth shade guides and, more particularly, to tooth shade guides in which a set of artificial teeth, made from porcelain or synthetic resin, are positioned in a row, said teeth resembling in shades a similar set of natural teeth. Without limitation thereto, the set of artificial teeth may resemble the six anterior teeth comprising both left and right centrals, laterals and cuspids. Although the present invention illustrates such a set of six anterior teeth, it is to be understood that this illustration merely is illustrative and is not to be regarded as limiting the invention.

In prosthetic dentistry, which is concerned with the fabrication of intra-oral devices comprising one or more artificial teeth which are to be substituted for natural teeth in a human oral cavity, it is highly desirable and, in modern prosthetic practice, necessary that the artificial teeth which are used in the prosthetic device correspond to the natural teeth they are replacing as exactly as possible from the standpoint of shade.

It is a known fact that the natural teeth of people of all ages vary in shade or hue of a substantially single shade, from tooth to tooth. Accordingly, modern prosthetic practice dictates that special effort be used in endeavoring to mount in an intraoral prosthetic device artificial teeth not only having the desired size but also, as closely as possible, matching in shade and hue the natural teeth which are being replaced by the artificial ones. In this regard, of the anterior teeth, the laterals are the smallest in size and usually they are the lightest in shade. The cuspids usually are next largest in size and are darker in shade than any of the other anterior teeth. The centrals, which are generally the largest of the anterior teeth, usually have a shade between that of the laterals and cuspids. While these teeth are said to differ in shade, actually they usually only differ in hue or intensity of the same shade. In artificial teeth, this difference in hue may be achieved by using the same shade in the body portion of the tooth and the more translucent enamel layer which overlies the body portion is varied in thickness from tooth to tooth, to produce a different overall hue between the teeth of a set.

To facilitate the selection of a desired shade of an artificial tooth or teeth by a dentist, shade guides long have been used. Conventional shade guides usually consist of a plurality of arms or bars which support at one end only a central artificial tooth. Each central tooth is of a different shade from the others and the entire set of central teeth constitutes a complete range of shades manufactured, for example, by an individual manufacturer. As far as is known, conventional shade guides used at present and heretofore have been of this nature universally and the bars upon which said teeth are supported have been held in a suitable holder. The shade of the tooth on each bar usually is indicated by a suitable symbol imprinted upon the bar.

Due, for example, to the fact that the teeth used in conventional shade guides universally are central teeth, difficulty frequently is experienced in selecting the desired shade or hue of a tooth other than a central, partly because of the unlike size of the central tooth to a lateral or cuspid for example. Furthermore, the light reflecting properties of different teeth vary in a human mouth, due for example to the shape and position thereof. To minimize the difficulties presented by these factors as much as possible, need has existed for a tooth shade guide in which a so-called "shade-in-set" principle was embodied in the teeth thereof and in which, for example, at least a partial set of artificial teeth was included in the shade guide. For example, it is preferred that either a minimum set comprising a central, lateral, and cuspid be used or, if desired, an entire set of six anterior teeth comprising both left and right centrals, laterals and cuspids. By using such a shade guide, it is possible to utilize the difference in hues of the shade of the various teeth in the set and thus facilitate the selection of a desired shade and hue for any of the anterior teeth, as well as posterior teeth, with greater facility and accuracy than has heretofore been possible while using conventional shade guides embodying only different shades of central teeth.

It is the principal object of the present invention to provide a shade guide in which preferably at least half of a set of anterior teeth are employed and held in natural appearing position, the centrals, laterals, and cuspids of said set each being different in hue of a single shade so as to correspond to the differences in hues in the shades of natural teeth although usually the shade designation of the central tooth controls in designating the shades of the other teeth of the set by a suitable common number or other symbol. Further, in situations where for example only one or two artificial teeth are desired in a prosthetic intraoral device, the tooth shade guide comprising the preferred embodiment of the present invention permits movement of the unnecessary teeth in the holder of the guide relative to said holder and away from the desired tooth or teeth in the holder. This facilitates comparison of the desired artificial tooth or teeth with the natural tooth or teeth they are to replace or the adjacent natural teeth between which they are to be used. Under such circumstances, the unneeded teeth of the shade guide may be moved laterally aside while still held by the holder. Correspondingly any desired grouping of teeth in the set may be made and held by the holder in natural appearing position by the dentist while comparison with the natural teeth is being made or for determining the most suitable shade and hues of teeth required by an edentulous patient.

Details of the foregoing objects and of the invention, as well as other objects thereof are set forth in the following specification and illustrated in the accompanying drawing comprising a part thereof.

Referring to the drawing.

Figures 5, 6:
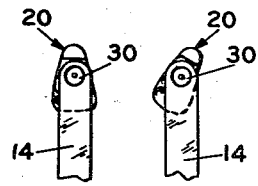

Figs. 5 and 6 respectively show fragmentary vertical rear elevations of single tooth holding arms and teeth attached thereto, the illustration in Fig. 5 showing the tooth disposed normally relative to the holding arm, while in Fig. 6, the tooth has been adjustably moved to an angular position relative to said holding arm.

Figure 7:
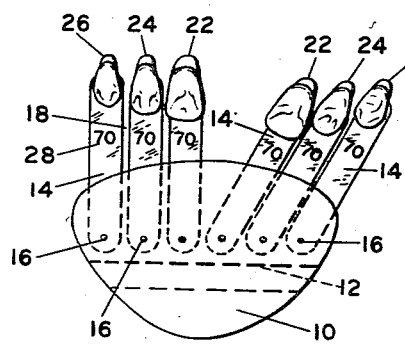
Figure 8:
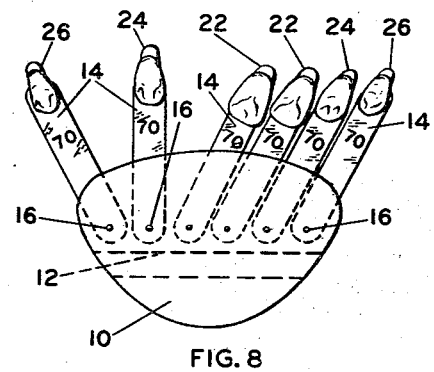

Figs. 7 and 8 are front vertical elevations of the tooth shade guide illustrating respectively two different exemplary arrangements of the teeth in the guide, wherein said different tooth arrangements are illustrated positioned for a comparison with the natural teeth of a patient, the teeth not being used for comparison being illustrated in separated position from those selected teeth of the guide.

The exemplary tooth shade guide, illustrated best in Figs. 1 and 2, and Figs. 7 and 8, and embodying the principles of the present invention, comprises a base or holder member 10 which may be formed, for example, by molding, from any suitable material. Synthetic resin is admirably suited for such purpose although the invention is not restricted to said material. Likewise, the shape of the holder member shown in the various figures is not to be considered restrictive. Preferably, the holder member is relatively thin, as is obvious from Figs. 2 through 4, in order that the shade guide may be conveniently held by the dentist for example while comparing the teeth of the guide with the teeth of a patient. The illustrated shape of the holder member 10 also facilitates the holding of the shade guide by the dentist but other shapes may be preferred.

The holder member 10 also preferably is provided with an elongated slot 12 which extends through said member between the opposite side edges of the member 10. The slot 12 receives the lower ends of a plurality of elongated arms or bars 14 which may be formed from any suitable material such as metal or synthetic resin. The fit between the lower ends of the arms 14 and the side walls of the member 10 defining slot 12 preferably is slightly tight so as to afford a desirable amount of friction between said arms and the holder member 10, whereby when the arms 14 have been positioned as desired by a dentist, for example, relative to the holder member 10, said position will be maintained readily, yet easy adjustment of the arms to a different position relative to the holder member 10 is permitted.

Figure 1:
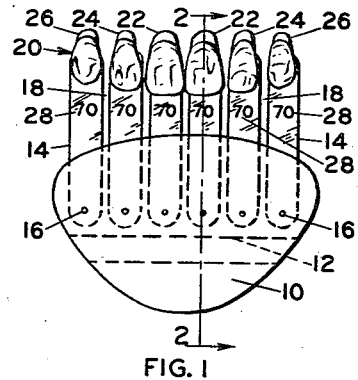
Fig. 1 is a front elevational view of an exemplary tooth shade guide embodying the principles of the present invention.

The arms 14 are so mounted within the slot 12 that they are spaced apart from each other as is clearly seen from Figs. 1, 7 and 8. Also, the lower ends of the bars 14 preferably are connected to the holder member 10 by any suitable means such as small headed pins or rivets 16 which readily permit pivotal movement of the arms 14 relative to holder member 10 and each other. The spaces 18 between the arms 14 constitute a relatively important feature of the invention in that it permits the arms 14 to be moved laterally about the pivot 16 thereof a considerable amount which, for example, enables the arms 14 to be moved as much as at least 45° from the normal or vertical position thereof shown in Fig. 1. Such lateral movement of the arms 14 relative to the holder member 10 is illustrated clearly in Figs. 7 and 8. In these figures, certain of the arms have been moved, as described, away from certain of the other arms, while the latter arms are held in the so-called normal, substantially vertical positions thereof.

Attached to the upper or outer ends of arms 14 is a set of exemplary anterior teeth 20, one tooth being attached to each arm. Preferably, for purposes of the present invention, said set of teeth are individually shaded so as to embody what is termed in the profession as shading-in-the-set. The exemplary set illustrated in Figs. 1, 7 and 8, for example, constitutes a left and right central tooth 20, a left and right lateral tooth 22, and a left and right cuspid tooth 24. In an average set of human anterior teeth, the lateral teeth are of a lighter shade than the other anterior teeth, the cuspids are the darkest of the six anterior teeth, and the centrals comprise a shade between that of the laterals and cuspids. The artificial teeth comprising the set 20 which are used in the shade guide comprising the present invention preferably are similarly shaded but have slightly different hues whereby, not only do the three left teeth and the three right teeth individually differ from each other in shape so as to imitate nature, but they also differ from each other in hue so as to rsemble the differences in hue of adjacent natural teeth as closely as possible.

Such an arrangement of teeth, which are shaded-in-the-set, materially aids a dentist, for example, in determining especially the shade of an artificial tooth best suited for an individual intra-oral dental restoration, notwithstanding the fact that all of the teeth of said set of artificial teeth in the shade guide will bear the same shade indicia such as a number for example, in order to simplify such indication for the teeth. An exemplary indicia is indicated 28 which will be seen as being stamped or molded upon the arms 14. The illustrated indicia of course comprises only one of an extensive set of indicia used by an individual manufacturer to indicate the various shades of its teeth. It will be understood of course that a plurality of such shade guides will be required to constitute a set of guides, each guide comprising a different shade.

Figure 2:
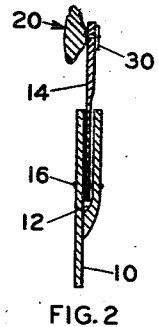
Fig. 2 is a vertical sectional view of the tooth shade guide taken on the line 2—2 of Fig. 1.

Preferably, the individual teeth of the set 20 are respectively secured adjustably to the outer end of each of the arms 14 which support them. The connecting means may constitute any suitable arrangement such as a pin which projects rearwardly from each tooth and extends through an opening in the outer end of the arm 14, as best shown in Fig. 2. A small washer 30 is fixed to the end of the pin which projects through the arm 14 so as to securely fasten the pin and tooth to the arm 14 but the tooth preferably may be pivotally moved about said pin relative to the arm 14 to any desired position as indicated, for example, in Fig. 6. The connection is such as to hold any relative position desired. Fig. 5 illustrates the so-called normal position of the tooth 20 relative to the arm 14. Such pivotal arrangement of the teeth relative to the arms 14 permits them to be positioned relative to each other when two or more teeth are being compared with a patient's teeth, so as to resemble a more life-like appearance, if required, as well as when determining the most suitable shade and hues of a set of teeth for an edentulous patient.

Figure 3:
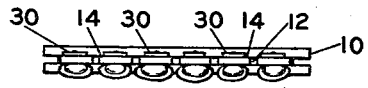
Fig. 3 is a top plan view of the type of shade guide shown in Fig. 1 and illustrating an embodiment thereof comprising a substantially flat holder member.
Figure 4:
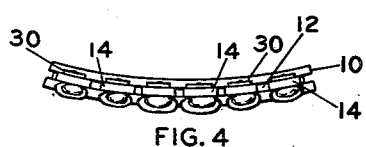
Fig. 4 is a vertical plan view of the type of shade guide shown in Fig. 1, but showing a different embodiment from that illustrated in Fig. 3, which comprises an arched or curved base member.

Further, in one embodiment of the invention, the relatively thin holder member 10 may be substantially flat as illustrated in Fig. 3, while in another embodiment of the invention, which is illustrated in Fig. 4, the holder member 10 may be somewhat arched or curved so as to present the teeth of the set in a more life-like disposition, if desired. The slot 12 in the holder member 10 of course will be shaped similarly to the holder member 10, as is clearly evident from Figs. 3 and 4.

While the present invention, as illustrated in the drawing, shows a complete set of six anterior teeth in the exemplary holder member, it is to be understood that the invention is not to be restricted to such showing of a complete set of teeth in that, if desired, only half of a complete set need be used, if desired. That is, only a central, lateral and cuspid, either right or left, may be mounted in a holder member 10, within the spirit of the present invention and the width of the holder member 10 will be correspondingly shorter.

The tooth shade guide comprising the present invention offers considerable latitude in arranging one or more teeth of a set of anterior teeth in position relative to the holder member 10 so as to be comparable readily with either teeth to be replaced in the mouth of a patient or with adjacent natural teeth of a patient in the event one or more of the natural teeth may be missing. For example, in the arrangement shown in Fig. 7, the left central, lateral, and cuspid, have been moved laterally aside, to the right as shown in Fig. 7, from the right central, lateral and cuspid which are substantially in position to be compared with the teeth in a patient's mouth, or determining an edentulous patient's requirements. If desired, the selected right central, lateral and cuspid may be moved into closely abutting position if desired and the frictional engagement between the arms 14 and the holder member 10 will hold said teeth in any position to which they are moved by the dentist for comparison purposes. Likewise, the unneeded left central, lateral and cuspid will be held in the inoperative position thereof shown in Fig. 7 while such comparison is being made.

In Fig. 8, still another exemplary disposition of the teeth of the set has been arranged so that only the right central 22 is disposed in the normal or operative comparison position, while all of the other unneeded teeth have been moved laterally, in opposite directions, away from the selected lateral tooth 22. It is to be understood of course that Figs. 7 and 8 represent only two exemplary arrangements for purposes of simplifying the illustration in the drawing. It will be recognized that numerous other arrangements are possible which will include from a single tooth to the complete set of teeth.

Normally, as much care need not be used in selecting the shade of the posterior teeth to be used in an intra-oral dental restoration as anterior teeth since the posterior teeth are not as obvious when a patient's mouth is open as the anterior or front teeth which are represented in the set illustrated in the drawing. This is the reason for usually using anterior artificial teeth in a tooth shade guide.

It will be seen from the foregoing and the accompanying drawing that the present invention provides a tooth shade guide which is highly useful in aiding a dentist in determining the most suitable shades of artificial teeth to be used in an intra-oral dental restoration, regardless of whether only a single tooth or an entire set of teeth are required for said restoration. The structure of the tooth shade guide is such that one or more artificial anterior teeth particularly of natural appearing shade and shape may be arranged in life-like position relative to each other and releasably be held in said position by the holder member of the shade guide while comparison of any of the selected teeth of the shade guide is made with the teeth of a patient. The unneeded teeth, while making a particular comparison, readily and automatically are held in inoperative position by the holder member of the shade guide, yet the entire set of artificial teeth is retained as a set by the holder member of the shade guide so that said teeth may not become separated from the set. Further, the shape of the holder member 10 of the shade guide is such as to enable the shade guide to be readily held by a dentist while making a comparison. Also, the structure of the elements of the shade guide is such that they may be inexpensively manufactured and assembled and thus be produced at low cost. The shade-in-set principle is embodied in the teeth of each shade guide, whereby true life-like, aesthetically correct shades are available while determining which artificial tooth or teeth should be used in any individual intra-oral restoration case.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A tooth shade guide comprising in combination, a relatively thin holder member, a set of artificial teeth of different hues of a shade arranged in a row in successive order and resembling a set of successive natural teeth in shape and hues, and means connecting said teeth to said holder member for movement only substantially within the plane of said member and normally supporting said teeth projected beyond said member in a row, said connecting means being inseparable from said holder member and also being arranged to permit a desired number of said teeth from one to the entire set to be held selectively by said holder member in normally appearing position adjacent the oral cavity of a patient while non-required teeth of said set may be moved relative to said holder member in a direction laterally away from said selected teeth and be supported in said latter position by said member.

2. A tooth shade guide comprising in combination, a holder member, a plurality of elongated arms pivotally connected adjacent one end to said holder member and supported thereby parallel to each other for movement relative to each other and said holder member within a common plane, and a plurality of artificial teeth comprising successive teeth of a set resembling in size and hue of a shade similar successive natural teeth, said teeth being secured respectively to the other ends of said arms and normally held thereby in a row when said arms are positioned in normal parallel relationship to each other, said arms and teeth also being pivotally movable away from each other within said plane, whereby the complete set of teeth or any desired individual tooth of selected adjacent individual teeth may be arranged in operative position and the others of the set separated therefrom for observation of the selected teeth adjacent the oral cavity of a patient.

3. A tooth shade guide comprising in combination, a holder member having an elongated slot therein, a plurality of elongated arms positioned normally parallel to each other in a row within said slot and projecting at one end therebeyond, means pivotally connecting the inner ends of said arms to said holder member within said slot, said arms being in spaced relationship to each other, and a set of artificial teeth of different sizes and hues of a shade resembling a set of similar successive natural teeth and respectively attached to the outer ends of said arms, said arms being of sufficient length to project beyond said holder member and normally supporting said teeth in a natural appearing row when said arms are parallel to each other and said arms being movable away from each other, whereby the complete set of teeth or any desired individual tooth or adjacent individual teeth may be arranged in operative position and the other teeth separated therefrom for observation of said selected teeth adjacent the oral cavity of a patient.

4. A tooth shade guide comprising in combination, a holder member having an elongated slot extending thereacross between the side edges thereof and downward from the normally upper edge, a plurality of elongated arms positioned normally parallel to each other in a row and spaced apart within said slot and projecting at one end therebeyond, said arms fitting into said slot sufficiently snugly to provide limited friction between said arms and member, means pivotally connecting the inner ends of said arms to said holder member in spaced relationship to each other, and a set of artificial teeth of different sizes and hues of a shade to resemble a set of similar successive natural teeth and respectively attached to the outer ends of said arms, said arms being of sufficient length to project beyond said holder member and normally supporting said teeth in a natural appearing row when said arms project normally outward from said holder member in parallel relationship to each other and said arms being movable away from each other, whereby the complete set of teeth or any selected individual tooth or adjacent individual teeth may be arranged in operative position and the other teeth separated therefrom for observation of said selected teeth adjacent the oral cavity of a patient.

5. A tooth shade guide comprising in combination, a plurality of blade-like members, a set of artificial teeth resembling in arrangement and size a set of successive natural teeth, said teeth being connected respectively to one end of each of said members and normally held thereby in a natural appearing row, and means pivotally connected to the other ends of said members and holding said members for selective lateral movement of said members and the teeth connected thereto relative to each other substantially within a common plane, whereby a selected number of teeth of said set may be held in natural appearing position by said members relative to each other for use in determining desired shades and lines of artificial teeth for a patient while the non-selected teeth of said shade guide are held by the members connected thereto laterally aside from said selected teeth.

References Cited in the file of this patent

UNITED STATES PATENTS

| | | |
|---|---|---|
| 785,992 | Whiteley | Mar. 28, 1905 |
| 1,078,431 | Grier et al. | Nov. 11, 1913 |
| 1,518,608 | Short | Dec. 9, 1924 |